(12) United States Patent
Nagasaka et al.

(10) Patent No.: US 6,400,488 B1
(45) Date of Patent: Jun. 4, 2002

(54) LIGHT BEAM SCANNER

(75) Inventors: Yasushi Nagasaka, Okazaki; Jun Kohsaka, Toyohashi; Kenji Takeshita, Toyokawa, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/669,894

(22) Filed: Sep. 27, 2000

(30) Foreign Application Priority Data

Sep. 27, 1999 (JP) .......................................... 11-273029

(51) Int. Cl.[7] .............................................. G02B 26/08
(52) U.S. Cl. ........................................ 359/212; 359/216
(58) Field of Search ................................ 359/196, 197, 359/212, 216, 217, 218, 223

(56) References Cited

U.S. PATENT DOCUMENTS 4,930,869 A * 6/1990 Miyagawa et al. ......... 359/196
5,757,532 A    5/1998 Takanashi .................. 359/196
5,861,978 A * 1/1999 Kamikubo ................. 359/208
5,903,379 A * 5/1999 Kamikubo ................. 359/212

FOREIGN PATENT DOCUMENTS

JP          8-184776          7/1996

* cited by examiner

Primary Examiner—Cassandra Spyrou
Assistant Examiner—Euncha Cherry
(74) Attorney, Agent, or Firm—Morrison & Foerster, LLP

(57) ABSTRACT

A polygon mirror is enclosed in an airtight cap that is provided with a polygon window. By having the normal line to the surface of the polygon window tilt a predetermined angle in the main scanning direction with respect to the principal ray of the light beam that is to be applied to the polygon window, the reflected light, which is a part of the light beam reflected by the surface of the polygon window, is not applied to the image forming area of a photoconductive drum.

20 Claims, 8 Drawing Sheets

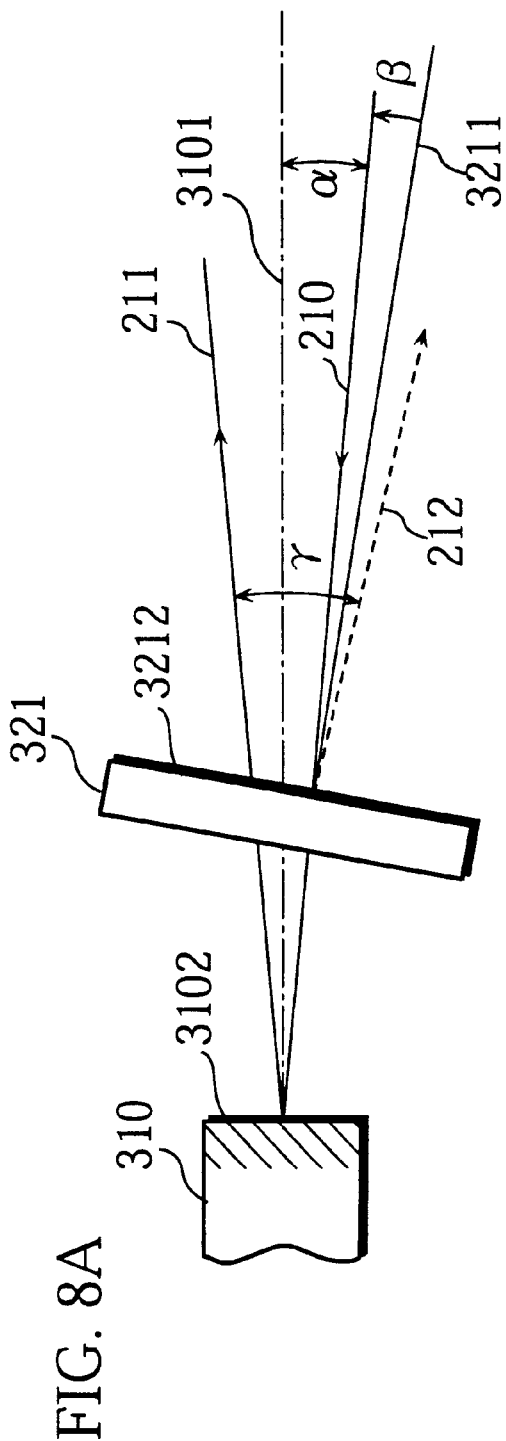
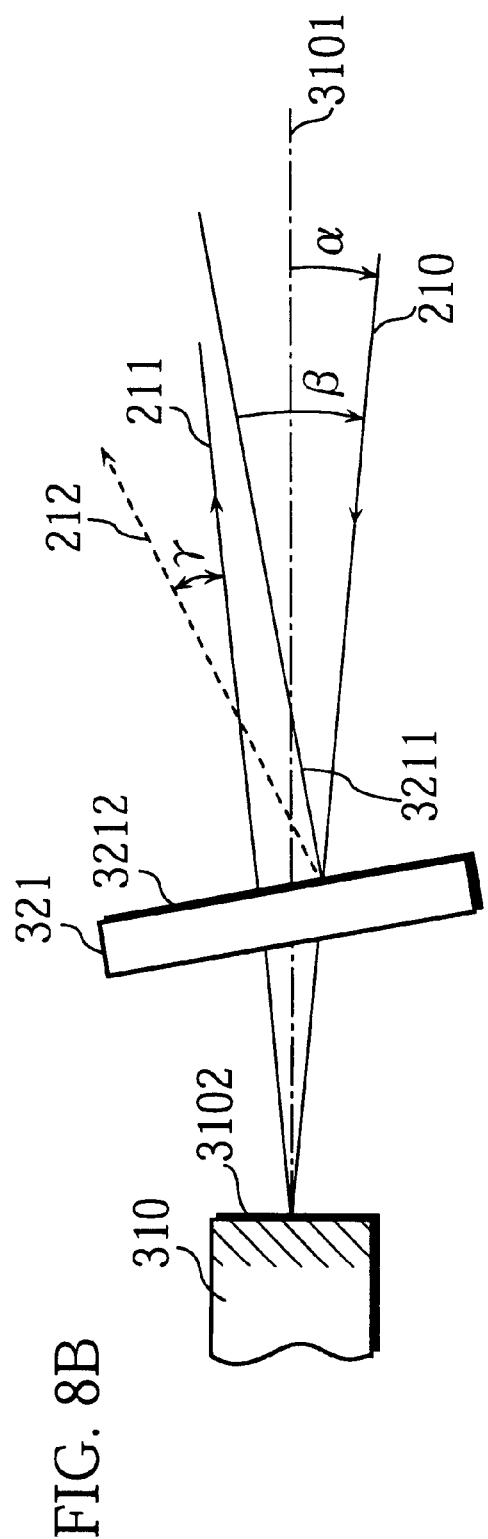
FIG. 8A
FIG. 8B

LIGHT BEAM SCANNER

This application is based on an application Ser. No. 11-273029 filed in Japan, the content of which is hereby incorporated by reference.

BACKGROUND OF THE INVENTION (1) Field of the Invention

The present invention relates to a light beam scanner that uses a laser diode and the like as the light source.

(2) Related Art

In the electrophotographic method printer or the digital copying machine, for instance, an image is formed in the following manner. The surface of the photoconductive drum is exposed by the light beam scanner to form an electrostatic latent image. Then, the electrostatic latent image is developed with toner and the toner image is transferred on a recording sheet.

In the light beam scanner, a laser beam from a semiconductor laser is applied onto a deflecting facet of a rotating polygon mirror via an incident optical system (the first optical system) such as a collimator lens. Next, the laser beam is deflected at a scanning angle within a certain range. The deflected beam is then applied onto the surface of the photoconductive drum via an optical scanning system (the second optical system) that includes a scanning lens so as to expose the surface of the photoconductive drum in the main scanning direction at a constant scanning speed. Note that a laser beam that is applied to the polygon mirror is referred to as an "incident beam" and a laser beam that is deflected by the polygon mirror is a "deflected beam" in this specification.

The light beam scanner is classified into two types, i.e., the underfilled optical system and the overfilled optical system, according to the relationship between the width of each of the mirrors (deflecting facets) of the polygon mirror in the main scanning direction (referred to as a "mirror width" in this specification) and the luminous flux width of the incident beam in the main scanning direction (referred to as an "incident beam width" in this specification). More specifically, the incident beam width is set to be smaller than the mirror width for the underfilled optical system. On the other hand, the incident beam width is set to be larger than the mirror width for the overfilled optical system.

For this structure of the overfilled optical system, the luminous flux width of the deflected beam can be set to be same as the mirror width, so that the number of deflecting facets of the polygon mirror can be increased without increasing the polygon mirror diameter. As a result, the scanning speed can be easily increased without upsizing the light beam scanner or increasing the driving force of the polygon motor for drive. For this reason, the overfilled optical system has recently received increasing attention as the demand for high density and high speed has grown.

On the other hand, however, the overfilled optical system has a problematic point. According to the angle that the incident beam forms with one deflecting facet, the width and the location of the incident beam cut by the deflecting facet vary and eventually the exposure quantity and the beam diameter in the main scanning direction vary. As a result, the light quantity is uneven in one scanning line and the image quality deteriorates.

One solution that has been proposed to this problem of the overfilled optical system is to set the principal ray of the incident beam, the scanning center axis of the optical scanning system, and the rotating axis of the polygon mirror to be approximately included in one plain, and to set the angle that the principal ray of the incident beam forms with the scanning center axis in the main scanning direction to be approximately 0°. (The optical system of this kind will be referred to as the "front incident optical system" in this specification, and suppose that the angle between the positions of the deflected beam at the start and finish of a scan of an object to be scanned is a "scanning angle", the principal ray of the deflected beam that bisects the scanning angle is defined as the "scanning center axis".)

In the front incident optical system, the incident beam is deflected so that deflected beams are approximately symmetric with respect to the scanning center axis. As a result, a required scanning angle can be obtained without drastically changing the angle that the incident beam forms with the deflecting facet and eventually the luminous flux width and the quantity of light of the deflected beam are relatively stable.

Note that the incident beam is reflected by the same deflecting facet to be applied to the scanned surface in the underfilled optical system, so that no problem arises as to the light quantity change. However, since the relationship between the luminous flux width of the deflected beam and the mirror width depends on the incident angle, it is also desirable for the underfilled optical system to have the structure of the front incident optical system in order to set the mirror width as small.

At the same time, the scanning speed needs to be raised due to the recent demand for high speed processing. However, when the rotation speed of the polygon mirror is raised for this purpose, the friction between the polygon mirror and the surrounding air is increased and eventually the power consumption and the wind noise caused by the friction become too large to be ignored.

A conventional solution to this problem is to enclose the polygon mirror in a housing. By doing so, disturbance by outside air is prevented, so that an air resistance is reduced and the wind noise is prevented.

One part of the housing is formed by a window (referred to as the "polygon window" in this specification) that is made of a light-transparent material such as glass and the incident beam passes through the polygon window to be applied to the polygon mirror. In the front incident optical system, both of the incident beam and the deflected beam pass through the same polygon window. The polygon window is set so that the surface of the polygon window is in parallel with the main scanning direction and the sub scanning direction in order to keep the symmetry of the deflected beam in the main scanning direction with respect to the scanning center axis.

However, the polygon window may reflect a part of the incident beam. When reaching the photoconductive drum, the reflected light (referred to as the "ghost beam" in this specification) may expose an undesired part of the surface of the photoconductive drum to deteriorate the image quality.

Especially, in the case of the front incident optical system, the optical path of the incident beam tends to be close to the optical path of the deflected beam in the sub scanning direction. Also, the polygon window is set so that the surface of the polygon window is in parallel with the main and sub scanning directions. As a result, the ghost beam travels close to the scanning center axis of the optical scanning system and the ghost beam is highly possibly applied to the photoconductive drum to deteriorate the image quality. This is highly problematic.

One solution to this problem is the multi-coating of the surface of the polygon window to prevent the ghost beam from arising as less frequently as possible. It is difficult, however, to completely eliminate the ghost beam. In addition, such coating raises the cost.

Another solution to this problem is to curve the surface of the polygon window to diffuse the reflected light. Even in this solution, however, it is difficult to eliminate the ghost beam. In addition, unnecessary optical power is added to the polygon window by the curve, and the precision of the drawing by the deflected beam that passes through the polygon window is degraded.

SUMMARY OF THE INVENTION

The present invention to provide a light beam scanner according to which the image is hardly deteriorated by the reflected light on the surface of the polygon window.

The includes a light beam scanner that includes: a light source unit; a polygon mirror for deflecting an incident beam from the light source unit, the polygon mirror being rotated for having a deflected beam scan a scanned surface in a main scanning direction, a rotational axis of the polygon mirror, a principal ray of the incident beam, and a scanning center axis being substantially included in a first plane, the principal ray of the incident beam being substantially parallel with the scanning center axis, wherein the scanning center axis is a principal ray of the deflected beam when the deflected beam bisects a scanning angle, the scanning angle being an angle between positions of the deflected beam at a start and a finish of a scan of the scanned surface; and a housing with a light-transparent window for enclosing the polygon mirror, the window being disposed on a light path of the incident beam from the light source unit to the polygon mirror, a surface of the window being tilted with respect to a second plane that orthogonally intersects with the first plane and is parallel with a sub scanning direction.

In the light beam scanner, the surface of the window is tilted with respect to the second plane that orthogonally intersects with the first plane and is parallel with the sub scanning direction. As a result, the ghost beam travels so as to be apart from the scanning center axis, so that the effects on the scanned surface, for instance, the image forming area of a photoconductive drum, can be reduced to prevent the image quality from deteriorating.

The invention may also include a light beam scanner that includes: a light source unit; a polygon mirror for deflecting an incident beam from the light source unit, the polygon mirror being rotated for having a deflected beam scan a scanned surface in a main scanning direction, a rotational axis of the polygon mirror, a principal ray of the incident beam, and a scanning center axis being substantially included in one plane, wherein the scanning center axis is a principal ray of the deflected beam when the deflected beam bisects a scanning angle, the scanning angle being an angle between positions of the deflected beam at a start and a finish of a scan of the scanned surface; a housing with a light-transparent plate window for enclosing the polygon mirror, the window being disposed on a light path of the incident beam from the light source unit to the polygon mirror so that a normal line to a surface of the window is tilted in a main scanning direction with respect to the principal ray of the incident beam.

In the light beam scanner, the normal line to the surface of the window tilts in the main scanning direction with respect to the principal ray of the light beam that is to be applied to the window. As a result, the ghost beam travels so as to be apart from the scanning center axis, so that the effects on the scanned surface can be reduced to prevent the image quality from deteriorating.

The invention may also include a light beam scanner that includes: a light beam scanner that includes: a light source unit; a polygon mirror with at least one deflecting facet for deflecting an incident beam from the light source unit, the polygon mirror being rotated for having a deflected beam scan a scanned surface in a main scanning direction, a rotational axis of the polygon mirror, a principal ray of the incident beam, and a scanning center axis being substantially included in one plane, wherein the scanning center axis is a principal ray of the deflected beam when the deflected beam bisects a scanning angle, the scanning angle being an angle between positions of the deflected beam at a start and a finish of a scan of the scanned surface; and a housing with a light-transparent plate window for enclosing the polygon mirror, the window being disposed on a light path of the incident beam from the light source unit to the polygon mirror so that a surface of the window is tilted in a sub scanning direction with respect to the deflecting facet when the principal ray of the deflected beam is positioned at the scanning center axis.

In the light beam scanner, the surface of the window tilts in the sub scanning direction with respect to the deflecting facet when the light beam that has been deflected by the deflecting facet of the polygon mirror is positioned at the scanning center axis. As a result, the ghost beam travels so as to be apart from the scanning center axis, so that the effects on the scanned surface can be reduced to prevent the image quality from deteriorating.

The invention may also include a light beam scanner that includes: a light source unit; a mirror with at least one reflective surface for deflecting an incident beam from the light source unit while changing a direction of the reflective surface and having a deflected beam scan a scanned object in a main scanning direction; and a housing with a light-transparent window for enclosing the mirror, the window being disposed on a light path of the incident beam from the light source to the mirror so that a normal line to a surface of the window where the incident beam is applied to the window is tilted in at least the main scanning direction with respect to a principal ray of the incident beam.

In the light beam scanner, the normal line to the surface of the window where the light beam from the light source unit is applied to the window tilts in at least the main scanning direction with respect to the principal ray of the light beam. As a result, the effects of the ghost beam on the scanned object, for instance, the image forming area of a photoconductive drum is reduced to prevent the image quality from deteriorating.

The invention may also include a light beam scanner that includes: a light source; a polygon mirror with at least one deflecting facet for deflecting an incident beam from the light source, the polygon mirror being rotated for having a deflected beam scan a scanned object; a housing with a light-transparent window for enclosing the polygon mirror, the window being disposed on a light path of the incident beam from the light source to the polygon mirror so that a surface of the window is tilted in at least a sub scanning direction with respect to the deflecting facet when a principal ray of the deflected beam is positioned at a scanning center axis, wherein the scanning center axis is the principal ray of the deflected beam when the deflected beam bisects a scanning angle, the scanning angle being an angle between positions of the deflected beam at a start and a finish of a scan of the scanned object.

In the light beam scanner, the surface of the window tilts in at least the sub scanning direction with respect to the deflecting facet of the polygon mirror when the principal ray of the deflected beam is positioned at the scanning center axis. As a result, the effects of the ghost beam on the scanned surface is reduced to prevent the image quality from deteriorating.

BRIEF DESCRIPTION OF THE DRAWINGS

These and other advantages and features of the invention will become apparent from the following description thereof taken in conjunction with the accompanying drawings which illustrate a specific embodiment of the invention. In the Drawings:

FIGS. 8A and 8B show how the surface of the polygon window tilts in the sub scanning direction with respect to the deflecting facet.

DESCRIPTION OF THE PREFERRED EMBODIMENT

An explanation of the preferred embodiment of the present invention will be given with reference to figures.
(Overall Structure)

Figure 1:
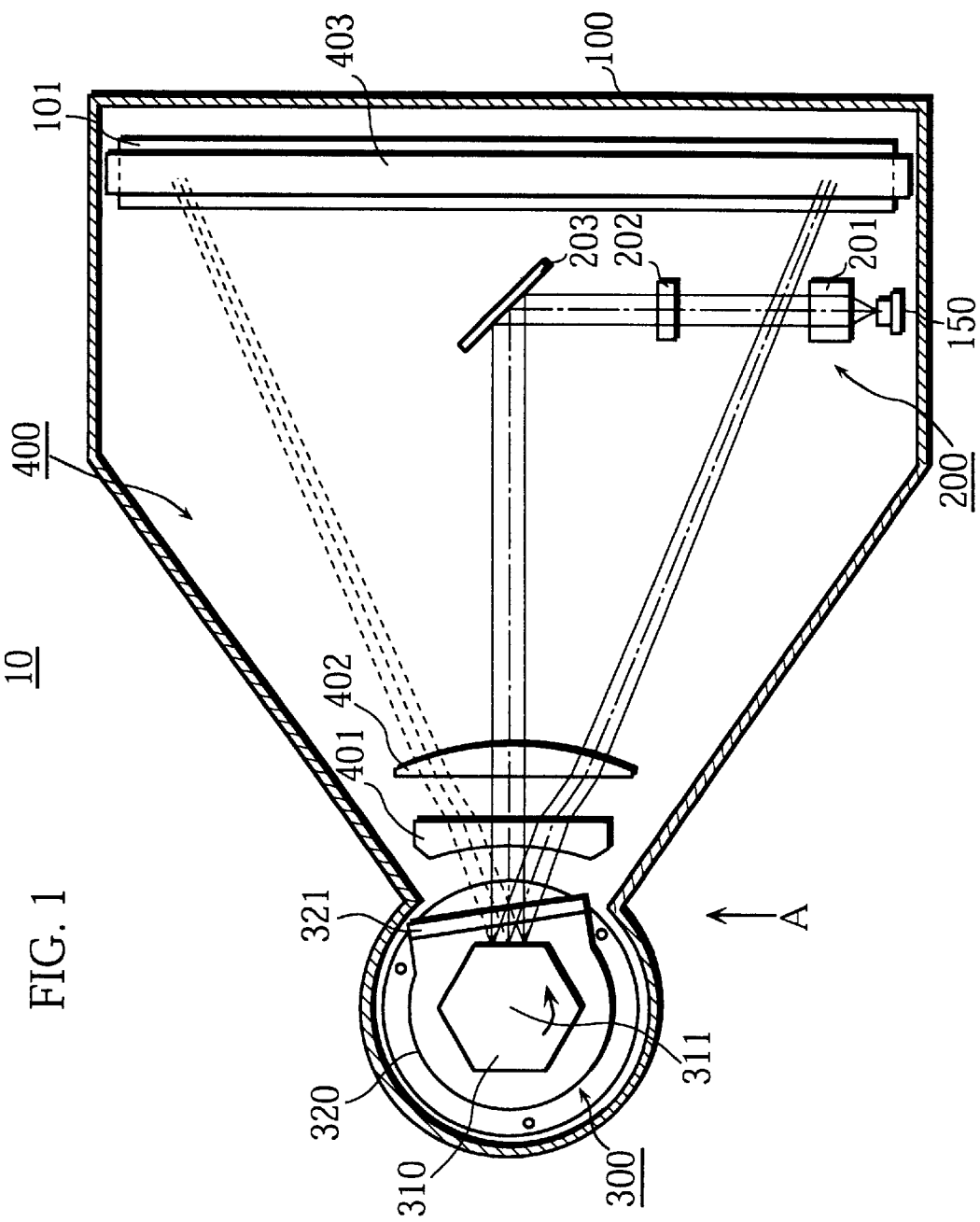
FIG. 1 is simplified sectional view showing the structure of beam scanner according to the preferred embodiment of the present invention.
Figure 2:
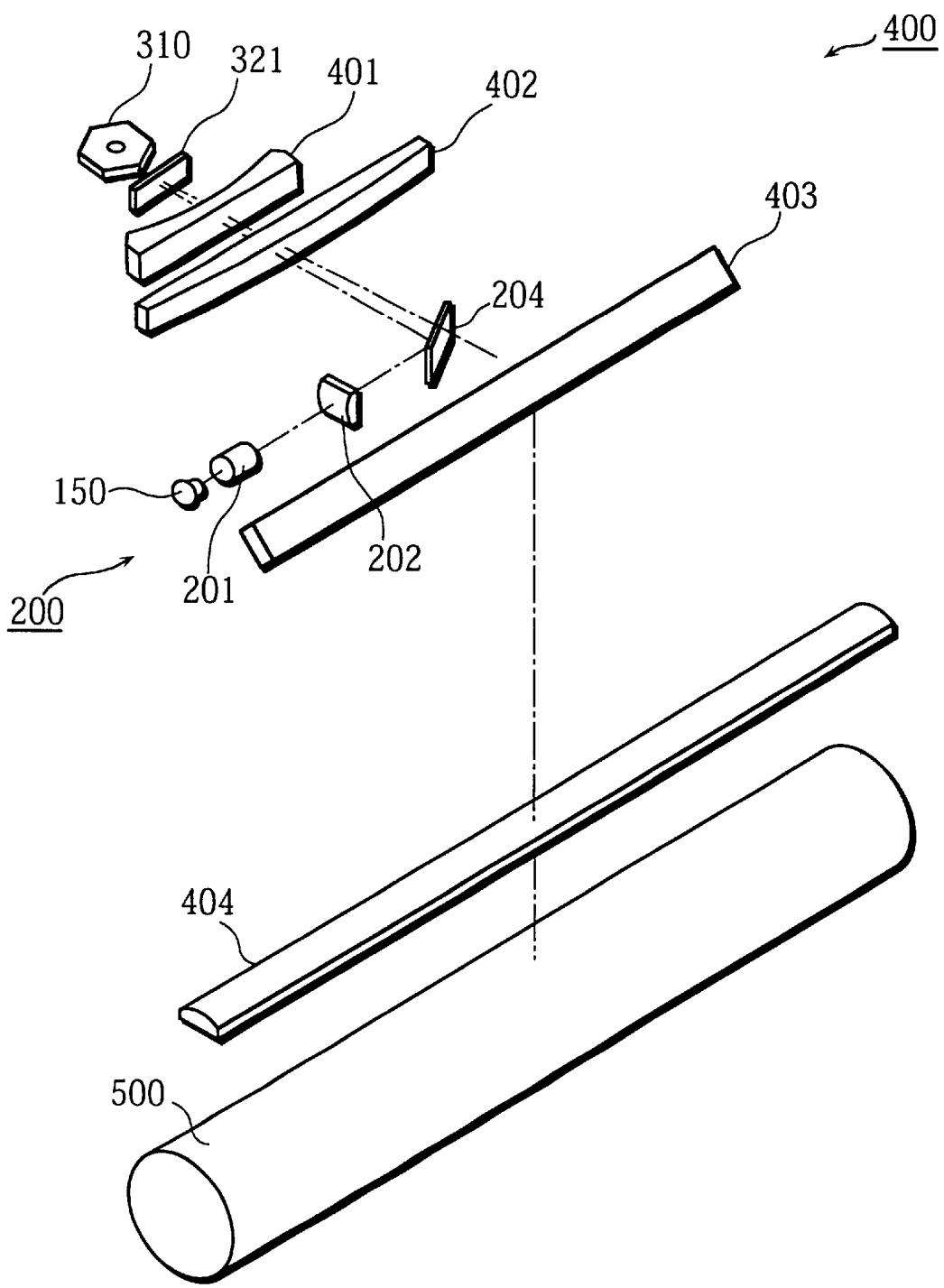
FIG. 2 perspective view showing the structure of the optical system of the light beam scanner.

FIG. 1 is a simplified sectional view showing the structure of a light beam scanner 10 according to the preferred embodiment of the present invention. FIG. 2 is a perspective view showing the overall structure of the light beam scanner 10 according to the preferred embodiment of the present invention. Note that the case and the like is not illustrated in FIG. 2 for convenience in explanation.

As shown in FIG. 1, the light beam scanner 10 includes a laser diode 150, an incident optical system (first optical system) 200, a deflection unit 300, and an optical scanning system (second optical system) 400 in a case 100. The laser diode 150 is the light source. The incident optical system 200 guides a laser beam from the laser diode 150 to the deflection unit 300. The deflection unit 300 includes a polygon mirror and deflects the laser beam that has been applied to the polygon mirror (an incident beam). The optical scanning system 400 refracts the laser beam that has been deflected by the deflection unit 300 (a deflected beam) so as to be converged on the surface of the photoconductive drum 500 and to move in the main scanning direction at a constant speed. The light beam scanner 10 has a structure of the front incident optical system. In the present embodiment, the light beam scanner is an underfilled light beam scanner. Needless to say that the light beam scanner 10 can be an overfilled light beam scanner.

The incident optical system 200 includes a collimator lens 201, a cylindrical lens 202, and a first reflection mirror 203. A laser beam that has been emitted from the laser diode 150 in the form of a diffused ray is change to an approximately parallel beam by the collimator lens 201. Next the laser beam passes through the cylindrical lens 202 for surface tilt correction and is reflected by the first reflection mirror 203. The laser beam then passes through scanning lenses 402 and 401 and a polygon window 321 and is applied to a deflecting facet of a polygon mirror 310 (the front incident optical system).

The laser beam that has been applied to the deflecting facet of the polygon mirror 310 is reflected in a variety of directions according to the consecutive rotation of the polygon mirror 310. More specifically, the incident beam is reflected in the rotation direction of the polygon mirror 310. Here, a plane formed by the locus of the deflected beam is defined as the "main scanning plane". Also, suppose that the angle between the positions of the deflected beam at the start and finish of a scan of the scanned surface is a "scanning angle", the principal ray of the deflected beam that bisects the scanning angle is defined as the "scanning center axis".

As explained later, in a structure of the double path, the main scanning plane is approximately in parallel with the incident beam. As a result, as for the angle that the scanning center axis forms with the principal ray of the incident beam, the incident beam is considered to be included in the main scanning plane without problem.

Figure 3:
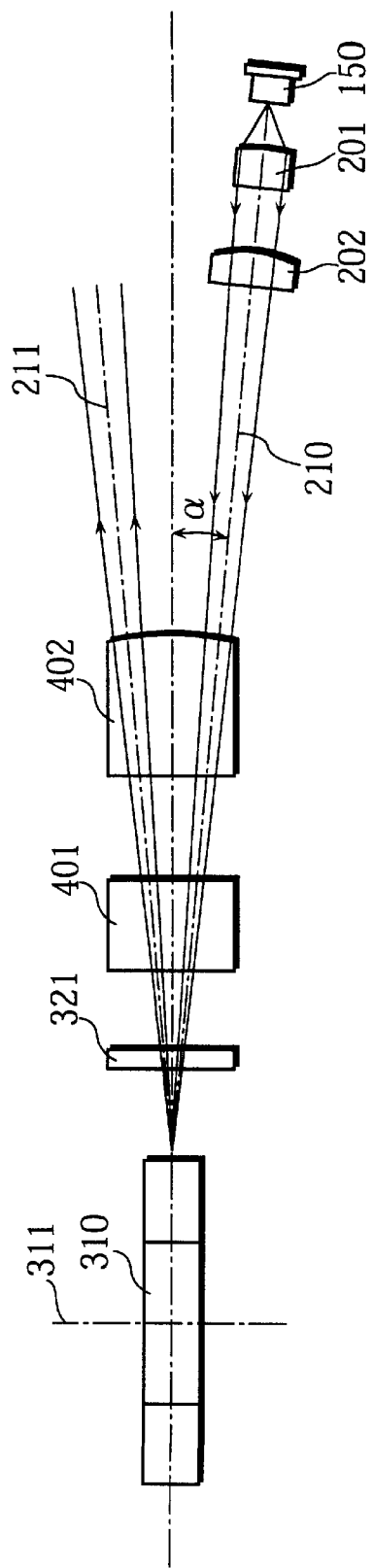
FIG. 3 shows a substantial part of FIG. 2 seen in the main scanning direction.

FIG. 3 shows a schematic diagram of FIG. 1 showing the optical path taken in the main scanning direction (seen from an arrow A in FIG. 1). The case 100, the first reflection mirror 203, a second reflection mirror 403, and an airtight cap 320 are not illustrated in FIG. 3 for convenience in explanation.

As shown in FIG. 3, the laser beam from the laser diode 150 (the incident beam) is refracted by the first reflection mirror 203 via the collimator lens 201 and the cylindrical lens 202. Then, the incident beam passes through the scanning lenses 402 and 401 and the polygon window 321 to be applied to the polygon mirror 310. The incident beam deflected by the polygon mirror 310 (the deflected beam) again passes through the polygon window 321 and the scanning lenses 401 and 402 and travels to the second reflection mirror 403. The structure in which both of the incident beam and the deflected beam pass through the same scanning lens is referred to the "double path" in this specification.

FIG. 3 shows a condition when the deflected beam is exactly positioned at the center of the scanning range, so that a principal ray 211 of the deflected beam is the scanning center axis. A principal ray 210 of the incident beam and the scanning center axis (the principal ray 211 in FIG. 3) are approximately included in one plane that includes a rotational axis 311 of the polygon mirror 310 (referred to the "sub scanning plain" in this specification). Also, the principal ray 210 is approximately in parallel with the principal ray 211 in the sub scanning plane.

There are two advantageous points in the double path.

The first advantageous point is as follows. Generally, the collimator lens is formed by a plurality of lenses so as to make the aberration little. In the double path, only the collimator lens 201 realizes collimation in the main scanning direction using the focal power of the scanning lenses 401 and 402 in the main scanning direction. By doing so, the number of the lenses that form the collimator lens is decreased. As a result, the cost is reduced and the space is saved incident in the optical system.

The second advantageous point is as follows. The angle that the incident beam forms with the deflected beam can be set small. As a result, the light beam scanner can be easily set at a place that is not so large in the sub scanning direction.

Now, the following explanation will be given in accordance with FIG. 1. In the deflection unit 300, the axis of the polygon mirror 310 is mounted on the rotational axis of a polygon motor (not illustrated). Also, the airtight cap 320 encloses the polygon mirror 310. The polygon window 321, which is a light-transparent plate such as glass, is attached to the airtight cap 320 where the incident beam and the deflected beam pass through. By having the polygon mirror 310 enclosed in the airtight cap 320, disturbance by outside air is prevented to rotate the polygon mirror 310 smoothly. Also, the leakage of the wind noise is prevented to obtain a soundproof effect.

Note that when a polygon mirror with an air bearing is used in order to realize high-speed rotation and when the shape of grooves (herringbone) on the surface of the rotational axis is set so that the air that has flown between the bearing of the motor and the rotational axis flows from the polygon mirror 310 in the direction opposite to the polygon mirror 310, the pressure inside of the airtight cap 320 is reduced along with the polygon motor rotation. As a result, the air resistance of the surrounding air to the deflecting facet of the polygon mirror 310 is reduced to smoothly rotate the polygon mirror 310. Also, the wind noise is prevented.

In addition, the polygon window 321 is set so that the normal line to the surface of the polygon window 321 tilts a predetermined degree in the main scanning direction with respect to the direction in which the incident beam is applied. By doing so, it is aimed that the adverse effect by the ghost beam is prevented. Concerning this point, a more-detailed explanation will be given later.

As shown in FIG. 2, the laser beam that has been deflected by the polygon mirror 310 (the deflected beam) is applied to the optical scanning system 400.

The optical scanning system 400 includes the scanning lenses 401 and 402, a scanning lens 404, and the second reflection mirror 403. The second reflection mirror 403 refracts the deflected beam that has passed through the scanning lenses 401 and 402 so as to apply the deflected beam to the photoconductive drum 500.

The deflected beam passes through the polygon window 321. Then, in order to keep the dot pitch on the surface of the photoconductive drum 500 constant in the main scanning direction, the deflected beam is refracted by the scanning lenses 401 and 402, the optical path is changed by the second reflection mirror 403, and the deflected beam passes through a slit 101 in the case 100 to be applied to the scanning lens 404 that is positioned under the slit 101. The deflected beam is focused in the sub scanning direction by the scanning lens 404 and exposes the surface of the photoconductive drum 500 that is positioned under the scanning lens 404 to form an electrostatic latent image.

Figure 4:
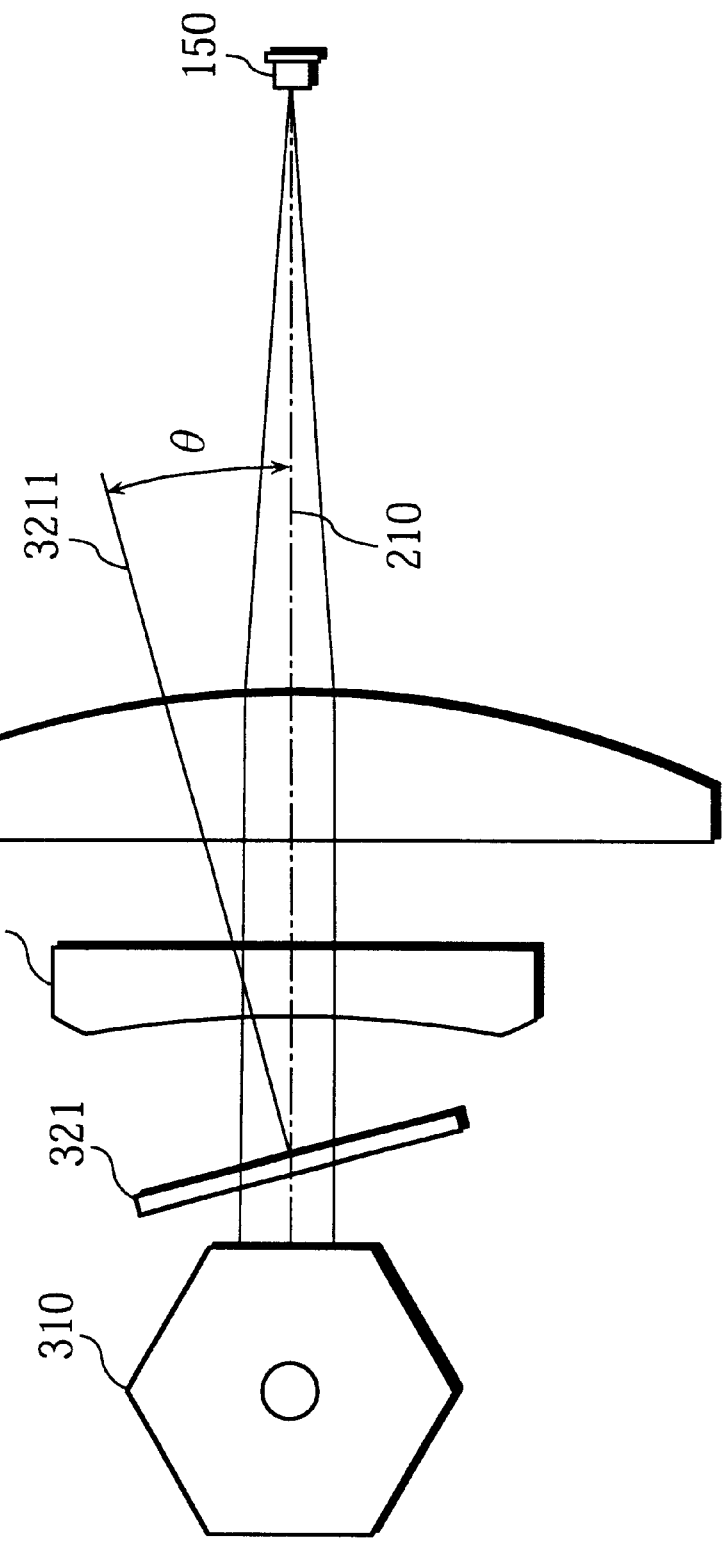
FIG. 4 shows how the normal line to the surface of a polygon window in the light beam scanner tilts in the main scanning direction.

FIG. 4 shows how the polygon window 321 tilts in the main scanning direction. The case 100, the collimator lens 201, the cylindrical lens 202, the first and second reflection mirrors 203 and 403, and the airtight cap 320 are not illustrated for convenience in explanation.

As has been described, the principal ray 210 of the incident beam and the scanning center axis are approximately included in one plane that includes the rotational axis 311, and the principal ray 210 is approximately in parallel with the principal ray 211 in the sub scanning plane.

A normal line 3211 to the surface of the polygon window 321 at the point where the incident beam is applied to the polygon window 321 tilts in the main scanning direction with respect to the principal ray 210 of the incident beam. The tilt amount is indicated by an angle θ that the normal line 3211 forms with the principal ray 210.

Figure 5A:
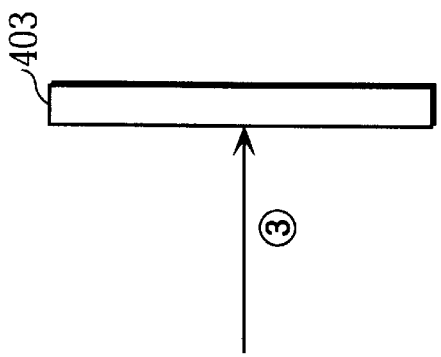
FIGS. 5A and 5B show how a ghost beam arises on the surface of the polygon window.
Figure 5A:
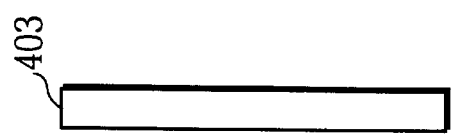

When θ=0° (in the conventional case), an incident beam ① from the light source is applied so as to orthogonally intersect with the surface of the polygon window 321 in the main scanning direction as shown in FIG. 5A. While most part of the incident beam ① passes through the polygon window 321, the remaining part is reflected at the surface of the polygon window 321. The reflected light ② of the incident beam ① travels in parallel with the deflected beam in the sub scanning direction and is applied to the second reflection mirror 403 as a ghost beam ③. The ghost beam ③ exposes an unexpected part of the surface of the photoconductive drum 500 to deteriorate the image quality.

Figure 5B:
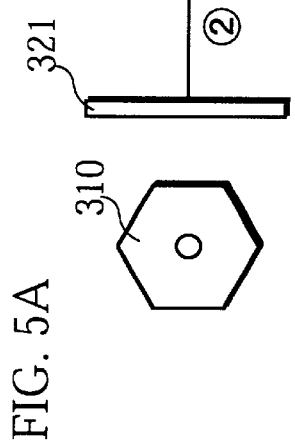
Figure 5B:
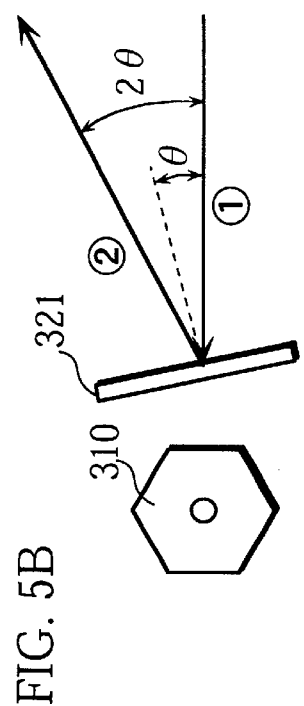

On the other hand, when the polygon window 321 is set so that the normal line to the surface of the polygon window 321 tilts θ° (>0°) in the main scanning direction with respect to the principal ray of the incident beam (as shown in FIG. 5B), the reflected light ② is reflected in the main scanning direction at an angle of 2θ° with respect to the incident beam ①. As a result, larger the value of θ, more difficult for the reflected light ② to be applied to the second reflection mirror 403 and less the effects of the ghost beam ③ on the photoconductive drum 500 (refer to FIG. 2). Here, suppose that the minimum angle that the normal line to the surface of the polygon window 321 forms with the principle ray of the incident beam in the main scanning direction when the ghost beam θ1 has no adverse effects on the electrostatic latent image on the photoconductive drum 500 as θ1°, the value of θ1 is set so that the ghost beam is eventually not applied to the image forming area on the photoconductive drum 500 in consideration of the distance between the surface of the polygon window 321 and the second reflection mirror 403 or the photoconductive drum 500, the width of the second reflection mirror 403 in the main scanning direction, and the width of the image forming area on the photoconductive drum 500 in the main scanning direction. The value of θ1 can be easily determined at the designing step of a specific light beam scanner.

However, when the polygon window 321 is tilted too much in the main scanning direction, the symmetry of the deflected beam after passing through the polygon window 321 with respect to the scanning center axis is slightly destroyed. In addition, due to the refraction by the polygon window 321, the position of the principal ray of the deflected beam is displaced to change the optical path length to the scanned surface on the photoconductive drum 500. As a result, the so-called field curvature arises to deteriorate image quality inadmissibly. It is problematic. Accordingly, there is the upper limitation for angle θ°.

Figure 6:
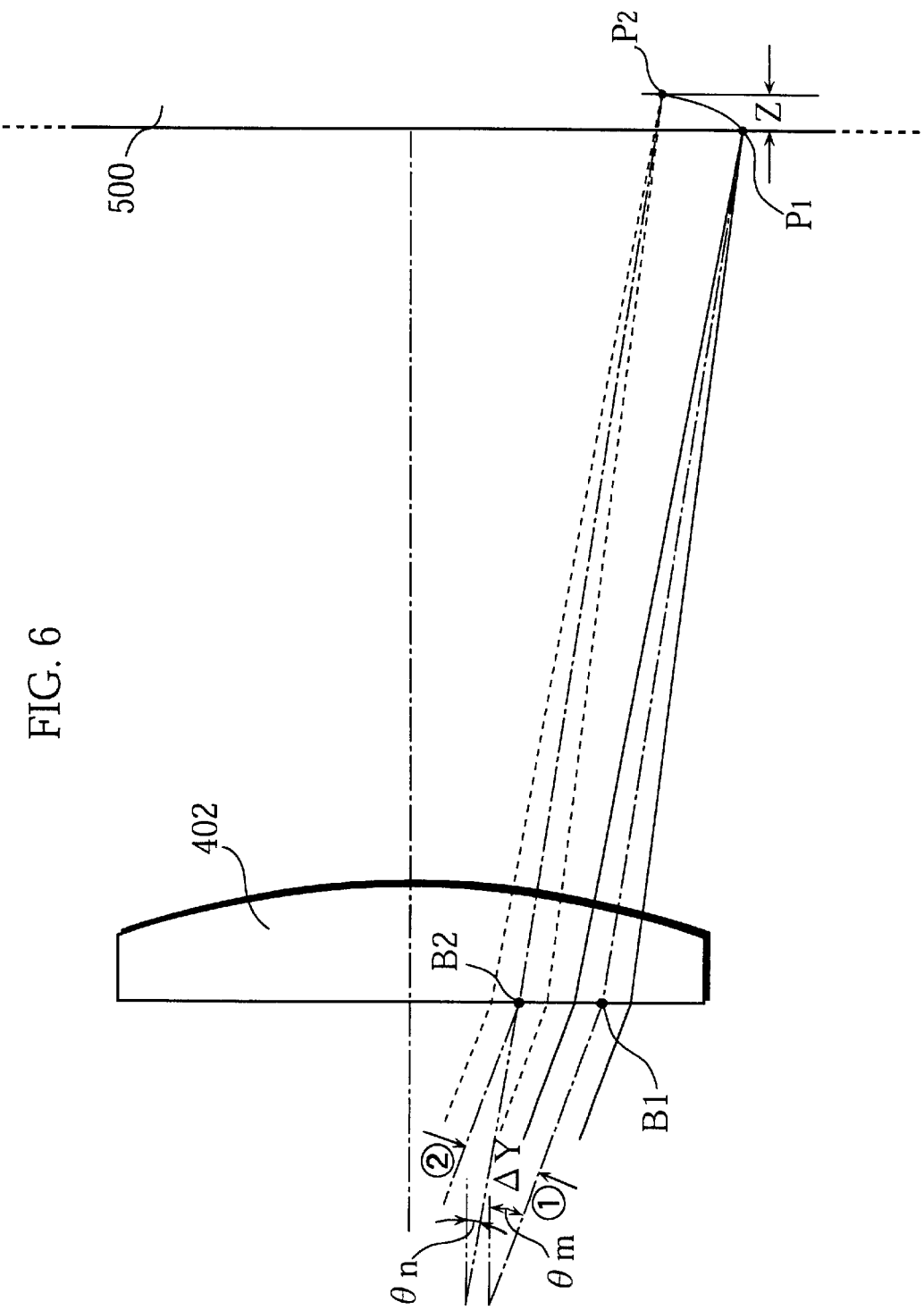
FIG. 6 is a drawing for explaining how the field curvature is caused by the displacement of the principal ray of a light beam at the polygon window.

FIG. 6 is a drawing for explaining how the field curvature is caused by the displacement of the principal ray of the deflected beam due to too much tilt of the polygon window 321. Note that the displacement amount of the principal ray is exaggerated for the purpose of illustration in FIG. 6.

The scanning lenses 401 and 402 are designed so that the principal ray of the deflected beam that has been deflected by the deflecting facet of the polygon mirror 310 (in FIG. 2) at a predetermined angle θm is applied to a point B1 on the scanning lens 402 and an image is formed at a image forming point P1 on the photoconductive drum 500 as indicated by a line ① in FIG. 6. As indicated by a line ②, however, when the principal ray is displaced by ΔY and is applied to a point B2 on the scanning lens 402, an image is formed at a point P2, which is not on the scanned surface of the photoconductive drum 500, for a deflected beam that has been deflected at an angle of deflection θm. This is because the scanning lens 402 is designed so as to form an image on the photoconductive drum 500 for a deflected beam that is applied to the point B2 and has been deflected at a different angle of deflection θn. Consecutive connection of such image forming points forms not a straight line but a curve, so that the image forming condition (exposure condition) deteriorates.

Here, the distance between the points P1 and P2 in the direction that is perpendicular to the scanned surface of the photoconductive drum 500 (in the direction of the scanning center axis) is set as "Z" and is defined as the field curvature amount (the displacement amount). According to the increasing demand for high-density image forming in recent years, the beam diameter is decreasing. Under the circumstances, even the maximum field curvature amount needs to be no greater than 2 mm.

The field curvature amount "Z" increases approximately three times the displacement amount ΔY of the applied laser beam at the maximum due to the characteristic of general scanning lens. As a result, it is preferable to set the curvature amount of the laser beam that is applied to the scanning lens as no greater than 0.65 mm, which is approximately one third of 2 mm.

Figure 7:
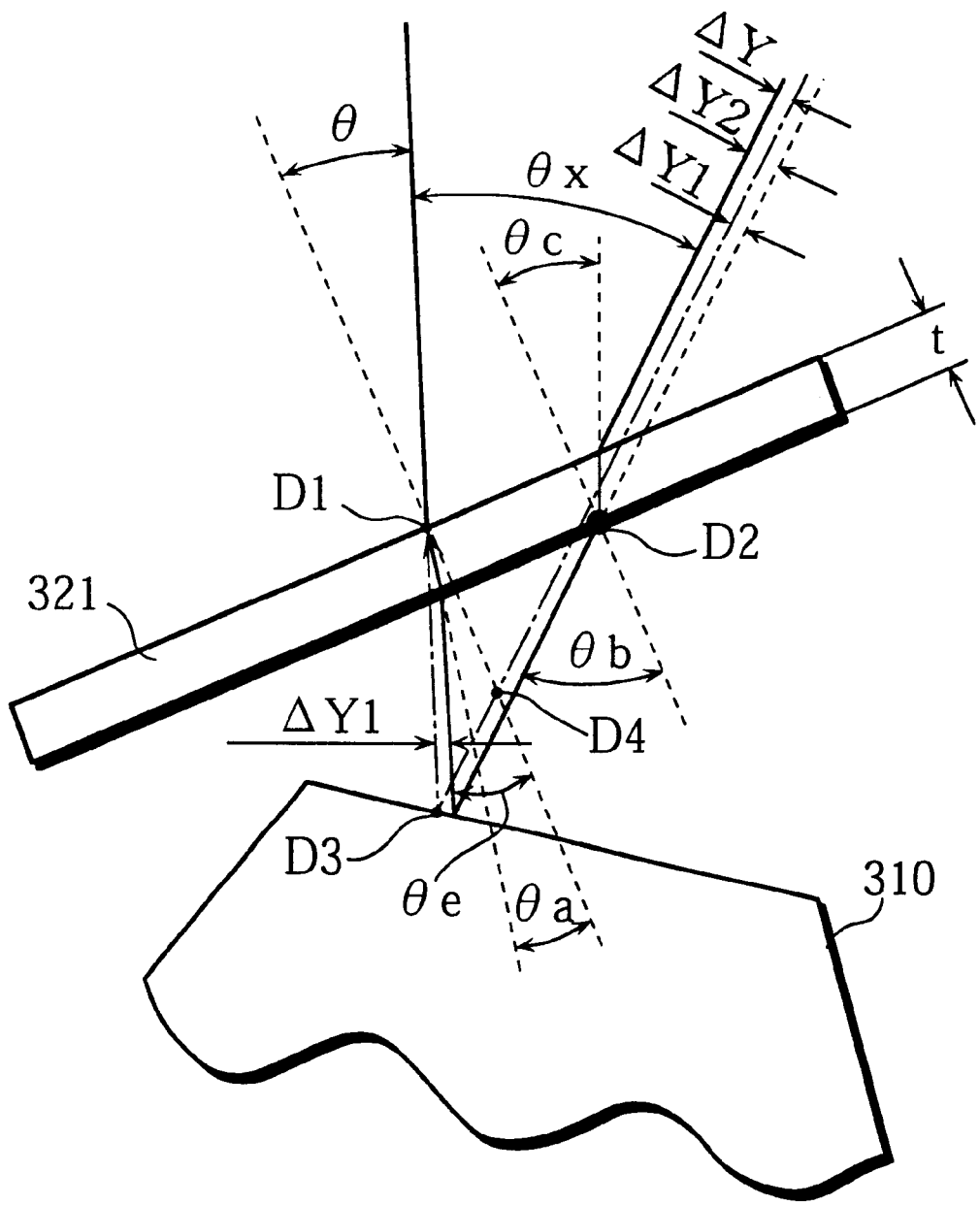
FIG. 7 is a drawing for explaining how to obtain the displacement amount ΔY of the light beam caused by the polygon window that tilts θ° in the main direction.

FIG. 7 is a drawing for explaining how to obtain the displacement amount ΔY of the laser beam when the polygon window 321 is set so that the normal line to the surface of the polygon window 321 tilts θ° in the main direction.

The polygon window 321 is a general glass plate with 2 mm of thickness. The refractive index "n" of the polygon window 321 is 1.51117.

When the incident beam passes through the polygon window 321, the position of the principal ray of the incident beam displaces by ΔY1 in parallel to the principal ray of the incident beam before passing through the polygon window 321 to the right in FIG. 7. The incident beam is reflected by the deflecting facet of the polygon mirror to be the deflected beam. When the deflected beam passes through the polygon window 321, the position of the principal ray is displaced by ΔY2 in parallel to the principal ray of the deflected beam before passing through the polygon window 321 to the left in FIG. 7.

On the other hand, the chain line in FIG. 7 indicates the optical path when the polygon window 321 is not interposed. As shown in FIG. 7, the displacement amount of the principal ray ΔY is obtained by (ΔY2−ΔY1).

The values ΔY2 and ΔY1 are obtained as follows.

$$\Delta Y1 = t(\tan \theta - \tan \theta a) \times \cos \theta \quad (1)$$

$$\Delta Y2 = t(\tan \theta - \tan \theta c) \times \cos \theta b \quad (2)$$

Here, the value θ indicates the angle that the normal line to the surface of the polygon window 321 forms with the principal ray of the incident beam. The angle θ is equal to the incident angle at a point D1. The value θa indicates the angle of refraction at the point D1, the value θb the incident angle at a point D2, and the value θc the angle of refraction at the point D2. The value of "t" indicates the thickness of the polygon window 321. As has been described, the value "t" is 2 mm in this specification.

On the other hand, the following equations hold according to the Snell's law.

$$\sin \theta = n \cdot \sin \theta a \quad (3)$$

$$\sin \theta b = n \cdot \sin \theta c \quad (4)$$

Suppose that the point at which the laser beam is applied to the deflecting facet of the polygon mirror when the polygon window 321 is not interposed as D3, suppose that the point of intersection of the normal line to the surface of the polygon window 321 at the point D1 and the optical path of the deflected beam of the laser beam when the polygon window 321 is not interposed as D4, suppose that the angle of deflection of the laser beam as θx, and suppose that the external angle of the angle that a line including the points D1 and D4 forms with a line including the points D4 and D3 as θe, the interior angle that a line including the points D1 and D3 forms with the line including the points D3 and D4 is θx and the interior angle that the line including the points D3 and D1 forms with the line including the points D1 and D4 is θ for a triangle consisting of the points D1, D3, and D4. As a result, according to the law of external angle, an equation θe=θ+θx (Equation (5)) holds.

The principal ray is displaced when passing through the polygon window 321 in parallel with the principal ray before passing through the polygon window 321, so that an equation θe=θb (Equation (6)) holds. From Equations (5) and (6), a relationship θb=θe+θx (Equation (7)) is established.

In addition, a relationship ΔY=ΔY2−ΔY1≦0.65 (Equation (8)) should be established in order to keep favorable image quality as has been described. The value ΔY is maximum for the specific value θ when the angle of deflection θx is maximum. In the front incident optical system, the maximum angle of deflection θx is set as approximately 30°. Suppose θx=30° to solve for θ according to Equations (1) to (4), (7), and (8), θ≦30° approximately.

As a result, as long as a general scanning lens and a general polygon window are used, the minimum permissible image quality can be kept when the angle θ that the normal line to the surface of the polygon window 321 forms with the principal ray of the incident beam in the main scanning direction is set no greater than 30° even if the polygon window 321 is tilted so as to exclude the effects of the ghost beam.

(Other Possible Modifications)

While an explanation of the preferred embodiment of the light beam scanner according to the present invention has been given, the present invention is not limited to the preferred embodiment. Other possible modifications will be given below.

(1) In the preferred embodiment, the normal line to the surface of the polygon window 321 is tilted in the main scanning direction with respect to the incident beam. This normal line can be tilted in the direction that orthogonally intersects with the main scanning direction (in the sub scanning direction) with respect to the deflecting facet of the polygon mirror 310.

FIGS. 8A and 8B are views seen from the main scanning direction showing how the polygon window 321 is set in the modification. In FIGS. 8A and 8B, the positions of the polygon mirror 310 and the polygon window 321 are shown. The scanning lenses and the airtight cap are not illustrated for convenience in explanation.

The chain line in FIGS. 8A and 8B indicates the normal line 3101 to a deflecting facet 3102 of the polygon mirror 310 when the principal ray 211 of the deflected beam is positioned at the scanning center axis. The polygon window 321 is set so that the normal line 3211 to the surface 3212 tilts in the sub scanning direction with respect to the normal line 3101. More specifically, the surface 3212 of the polygon window 321 tilts in the sub scanning direction with respect to the deflecting facet 3102 (the surface 3212 of the polygon window 321 is not in parallel to the deflecting facet 3102).

In FIG. 8A, the surface 3212 of the polygon window 321 tilts downward in the sub scanning direction with respect to the deflecting facet 3102. In FIG. 8B, the surface 3212 of the polygon window 321 tilts upward in the sub scanning direction with respect to the deflecting facet 3102.

By tilting the surface 3212 of the polygon window 321 in the sub scanning direction with respect to the deflecting facet 3102 in this manner, a sub-scanning-direction incident angle θ that the principal ray 210 of the incident beam forms with respect to the deflecting facet 3102 of the polygon mirror 310 (the incident angle projected on the sub scanning plane, positive in the clockwise direction) is different from a sub-scanning-direction incident angle β that the principal ray 210 of the incident beam forms with respect to the surface 3212 of the polygon window 321 (the incident angle projected on the sub scanning plane, positive in the clockwise direction). As a result, a reflected light (the ghost beam) 212 that has been generated by the reflection of a part of the incident beam applied to the polygon window 321 (only the principal ray of the reflected light 212 is indicated by the dotted line in FIGS. 8A and 8B) is not in parallel with the principal ray 211 of the deflected beam. Here, an angle r that the principal ray 212 of the ghost beam forms with the principal ray 211 of the deflected beam is expressed by an equation, $\gamma = 2 \times |\alpha - \beta|$.

The larger the angle γ, the more difficult for the ghost beam to be applied to the second reflection mirror 403 and the less the effect of the ghost beam that is applied to the photoconductive drum 500 (refer to FIG. 2).

Suppose that the minimum value of the angle γ when the ghost beam has no effect on forming the electrostatic latent image on the surface of the photoconductive drum 500 as γ1, the value of γ1 is set in consideration of the distance between the surface 3212 of the polygon window 321 to the reflective surface of the second reflection mirror 403 or to the surface of the photoconductive drum 500, the width of the second reflection mirror 403 in the sub scanning direction, the width of the incident beam in the sub scanning direction that has been made approximately parallel by the collimator lens 201 and the like so as not to eventually apply the ghost beam to the image forming area on the photoconductive drum 500. The value of γ1 can be easily determined at the designing step of a specific light beam scanner.

Note that too much tilt of the polygon window 321 in the sub scanning direction cause inconvenience similar to the case of the too much tilt polygon window 321 in the main scanning direction in the preferred embodiment. As a result, the degree of the tilt in the sub scanning direction has the upper limitation.

As has been described, by tilting the surface 3212 of the polygon window 321 in the sub scanning direction with respect to the deflecting facet 3102 of the polygon mirror 310, the ghost beam is prevented from being applied to the photoconductive drum 500 to prevent image quality from deteriorating.

Note that the polygon window 321 may be set so as to tilt the normal line to the surface 3212 of the polygon window 321 in the main scanning direction with respect to the principal ray 210 of the incident beam as shown in FIG. 4 and to tilt the surface 3212 in the sub scanning direction with respect to the deflecting facet 3102 of the polygon mirror 310 as shown in FIGS. 8A and 8B.

It is essential only to set the polygon window 321 so as not to eventually apply the reflected light (the ghost beam) of the laser beam that has been applied to the polygon window 321 to the scanned object such as the photoconductive drum 500. Accordingly, the light beam scanner of the present invention is not limited to the light beam scanner with the front incident optical system and is applicable to the light beam scanner with other optical systems.

(2) While an explanation has been given for the single beam system using one laser diode in the preferred embodiment, the present invention is applicable to the multi-beam system using a plurality of light sources.

Although the present invention has been fully described by way of examples with reference to the accompanying drawings, it is to be noted that various changes and modifications will be apparent to those skilled in the art. Therefore, unless such changes and modifications depart from the scope of the present invention, they should by construed as being included therein.

What is claimed is:

1. A light beam scanner comprising:
   a light source unit;
   a polygon mirror for deflecting an incident beam from the light source unit, the polygon mirror being rotated for having a deflected beam scan a scanned surface in a main scanning direction, a rotational axis of the polygon mirror, a principal ray of the incident beam and a scanning center axis being substantially included in a first plane, the principal ray of the incident beam being substantially parallel with the scanning center axis, wherein
   the scanning center axis is a principal ray of the deflected beam when the deflected beam bisects a scanning angle, the scanning angle being an angle between positions of the deflected beam at a start and a finish of a scan of the scanned surface; and
   a housing with a light-transparent window for enclosing the polygon mirror, the window being disposed on a light path of the incident beam from the light source unit to the polygon mirror, a surface of the window being tilted with respect to a second plane that orthogonally intersects with the first plane and is parallel with a sub scanning direction.

2. A light beam scanner comprising:
   a light source unit;
   a polygon mirror for deflecting an incident beam from the light source unit, the polygon mirror being rotated for having a deflected beam scan a scanned surface in a main scanning direction, a rotational axis of the polygon mirror, a principal ray of the incident beam, and a scanning center axis being substantially included in one plane, wherein
   the scanning center axis is a principal ray of the deflected beam when the deflected beam bisects a scanning angle, the scanning angle being an angle between positions of the deflected beam at a start and a finish of a scan of the scanned surface;
   a housing with a light-transparent plate window for enclosing the polygon mirror, the window being disposed on a light path of the incident beam from the light source unit to the polygon mirror so that a normal line to a surface of the window is tilted in a main scanning direction with respect to the principal ray of the incident beam.

3. The light beam scanner according to claim 2, wherein a tilt angle between the normal line and the principal ray of the incident beam is set to be large enough to avoid applying a reflected light, which is a part of the incident beam reflected by the window, to the scanned surface.

4. The light beam scanner according to claim 2, wherein a tilt angle between the normal line and the principal ray of the incident beam is set so that an amount of displacement of an image forming position from the scanned surface due to the tilt angle is no greater than 2 mm in a direction parallel with the scanning center axis.

5. A light beam scanner comprising:
a light source unit;
a polygon mirror with at least one deflecting facet for deflecting an incident beam from the light source unit, the polygon mirror being rotated for having a deflected beam scan a scanned surface in a main scanning direction, a rotational axis of the polygon mirror, a principal ray of the incident beam, and a scanning center axis being substantially included in one plane, wherein
the scanning center axis is a principal ray of the deflected beam when the deflected beam bisects a scanning angle, the scanning angle being an angle between positions of the deflected beam at a start and a finish of a scan of the scanned surface; and
a housing with a light-transparent plate window for enclosing the polygon mirror, the window being disposed on a light path of the incident beam from the light source unit to the polygon mirror so that a surface of the window is tilted in a sub scanning direction with respect to the deflecting facet when the principal ray of the deflected beam is positioned at the scanning center axis.

6. The light beam scanner according to claim 5, wherein a tilt angle between the surface of the window and the deflecting facet is set to be large enough to avoid applying a reflected light, which is a part of the incident beam reflected by the window, to the scanned surface.

7. The light beam scanner according to claim 5, wherein a tilt angle between the surface of the window and the deflecting facet is set so that an amount of displacement of an image forming position from the scanned surface due to the tilt angle is no greater than 2 mm in a direction parallel with the scanning center axis.

8. A light beam scanner comprising:
a light source unit;
a mirror with at least one reflective surface for deflecting an incident beam from the light source unit while changing a direction of the reflective surface and having a deflected beam scan a scanned object in a main scanning direction; and
a housing with a light-transparent window for enclosing the mirror, the window being disposed on a light path of the incident beam from the light source to the mirror so that a normal line to a surface of the window where the incident beam is applied to the window is tilted in at least the main scanning direction with respect to a principal ray of the incident beam, wherein
the mirror is rotated on a rotational axis,
the rotational axis of the mirror, the principal ray of the incident beam, and a scanning center axis are substantially included in one plane, and
the scanning center axis is a principal ray of the deflected beam when the deflected beam bisects a scanning angle, the scanning angle being an angle between positions of the deflected beam at a start and a finish of a scan of the scanned object.

9. The light beam scanner according to claim 8, wherein a tilt angle between the normal line and the principal ray of the incident beam is set to be large enough to avoid applying a reflected light, which is a part of the incident beam reflected by the window, to the scanned object.

10. The light beam scanner according to claim 8, wherein a tilt angle between the normal line and the principal ray of the incident beam is set so that an amount of displacement of an image forming position from the scanned object due to the tilt angle is no greater than 2 mm in a direction parallel with a scanning center axis, wherein
the scanning center axis is a principal ray of the deflected beam when the deflected beam bisects a scanning angle, the scanning angle being an angle between positions of the deflected beam at a start and a finish of a scan of the scanned object.

11. The light beam scanner according to claim 8, wherein the window is disposed so that the surface of the window is tilted in a sub scanning direction with respect to the reflective surface when a principal ray of the deflected beam is positioned at a scanning center axis, wherein
the scanning center axis is the principal ray of the deflected beam when the deflected beam bisects a scanning angle, the scanning angle being an angle between positions of the deflected beam at a start and a finish of a scan of the scanned object.

12. The light beam scanner according to claim 8, wherein the deflected beam passes through the window to be applied to the scanned object.

13. The light beam scanner according to claim 8, further comprising a reflection mirror that is disposed on a light path of the deflected beam from the mirror to the scanned object so as to reflect the deflected beam and guide the deflected beam to the scanned object.

14. The light beam scanner according to claim 13, wherein a tilt angle between the normal line and the principal ray of the incident beam is set to be large enough to avoid applying a reflected light, which is a part of the incident beam reflected by the window, to the reflection mirror.

15. A light beam scanner comprising:
a light source;
a polygon mirror with at least one deflecting facet for deflecting an incident beam from the light source, the polygon mirror being rotated for having a deflected beam scan a scanned object; and
a housing with a light-transparent window for enclosing the polygon mirror, the window being disposed on a light path of the incident beam from the light source to the polygon mirror so that a surface of the window is tilted in at least a sub scanning direction with respect to the deflecting facet when a principal ray of the deflected beam is positioned at a scanning center axis, wherein
the scanning center axis is the principal ray of the deflected beam when the deflected beam bisects a scanning angle, the scanning angle being an angle between positions of the deflected beam at a start and a finish of a scan of the scanned object, and
a rotational axis of the polygon mirror, a principal ray of the incident beam, and the scanning center axis are substantially included in one plane.

16. The light beam scanner according to claim 15, wherein a tilt angle between the surface of the window and the deflecting facet is set to be large enough to avoid applying a reflected light, which is a part of the incident beam reflected by the window, to the scanned object.

17. The light beam scanner according to claim 15, wherein a tilt angle between the surface of the window and the deflecting facet is set so that an amount of displacement of an image forming position from the scanned object due to the tilt angle is no greater than 2 mm in a direction parallel with the scanning center axis.

18. The light beam scanner according to claim 15, wherein the deflected beam passes through the window to be applied to the scanned object.

19. The light beam scanner according to claim 15, further comprising a reflection mirror that is disposed on a light path of the deflected beam from the polygon mirror to the scanned object so as to reflect the deflected beam and guide the deflected beam to the scanned object.

20. The light beam scanner according to claim 19, wherein a tilt angle between the surface of the window and the deflecting facet is set to be large enough to avoid applying a reflected light, which is a part of the incident beam reflected by the window, to the reflection mirror.

* * * * *